Jan. 11, 1944.          J. A. DAVIS ET AL          2,339,062
                             PHONOGRAPH
                       Filed Nov. 4, 1940          10 Sheets-Sheet 1
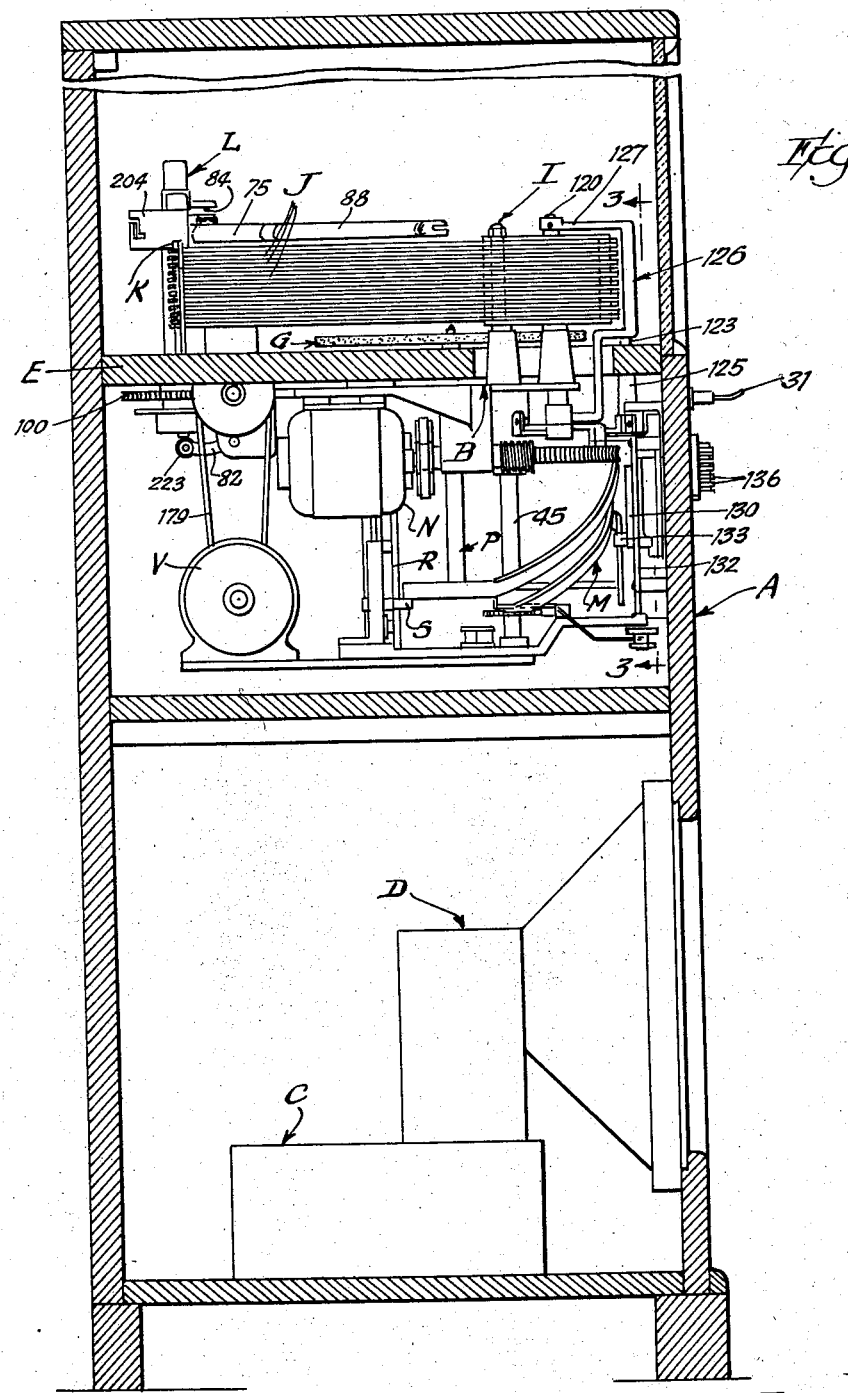
Fig.1
Inventors:
James A. Davis
Irving Gil
Attys.

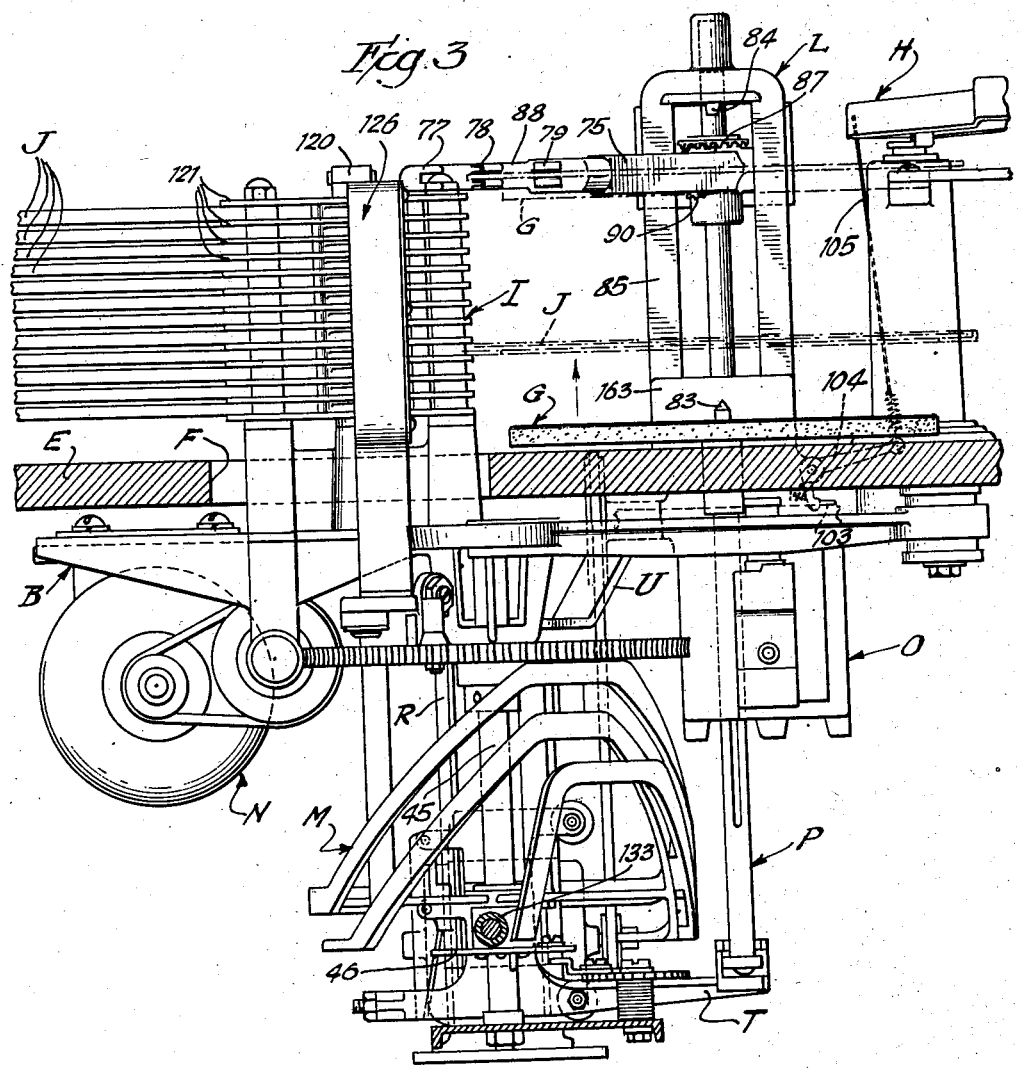

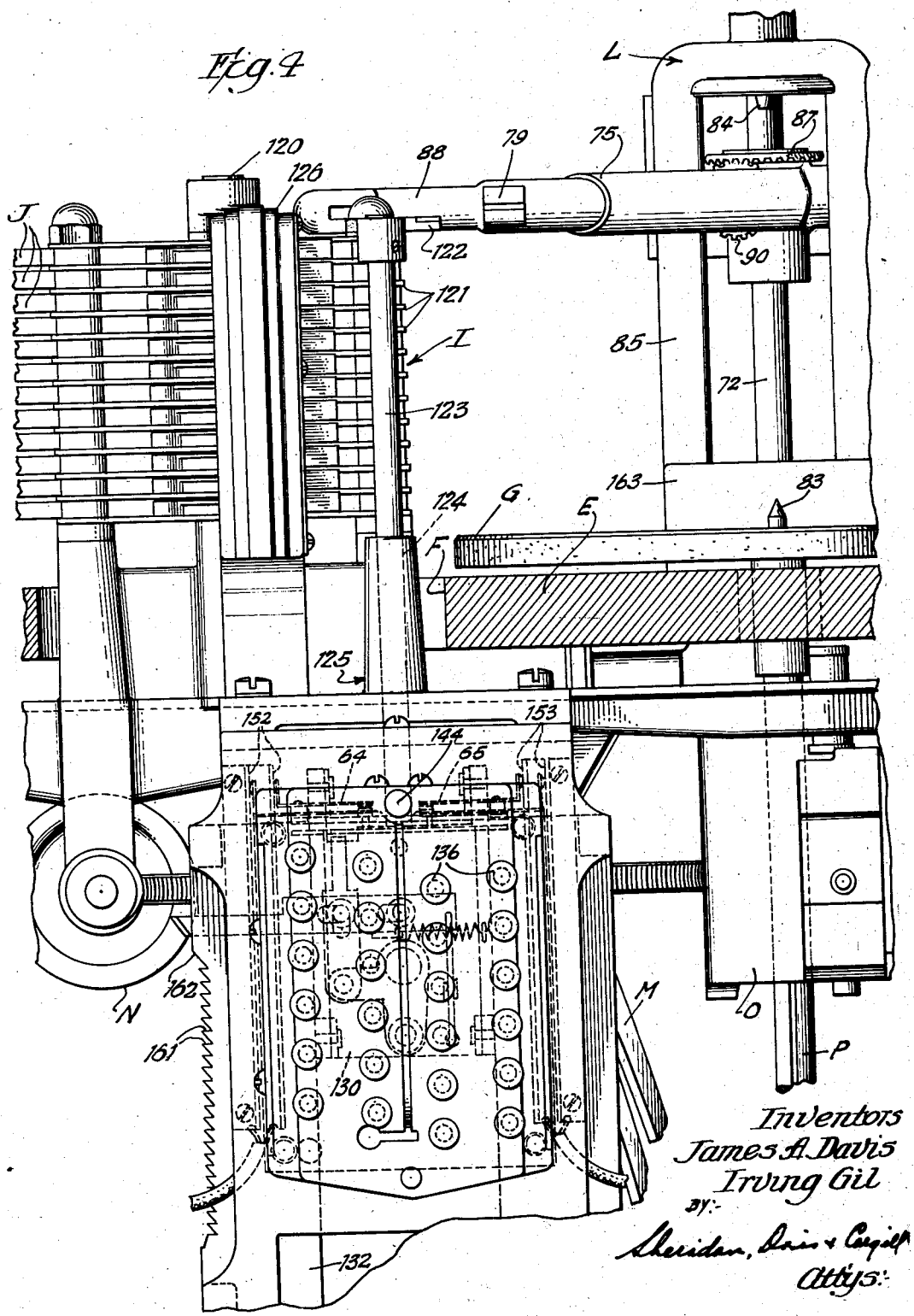

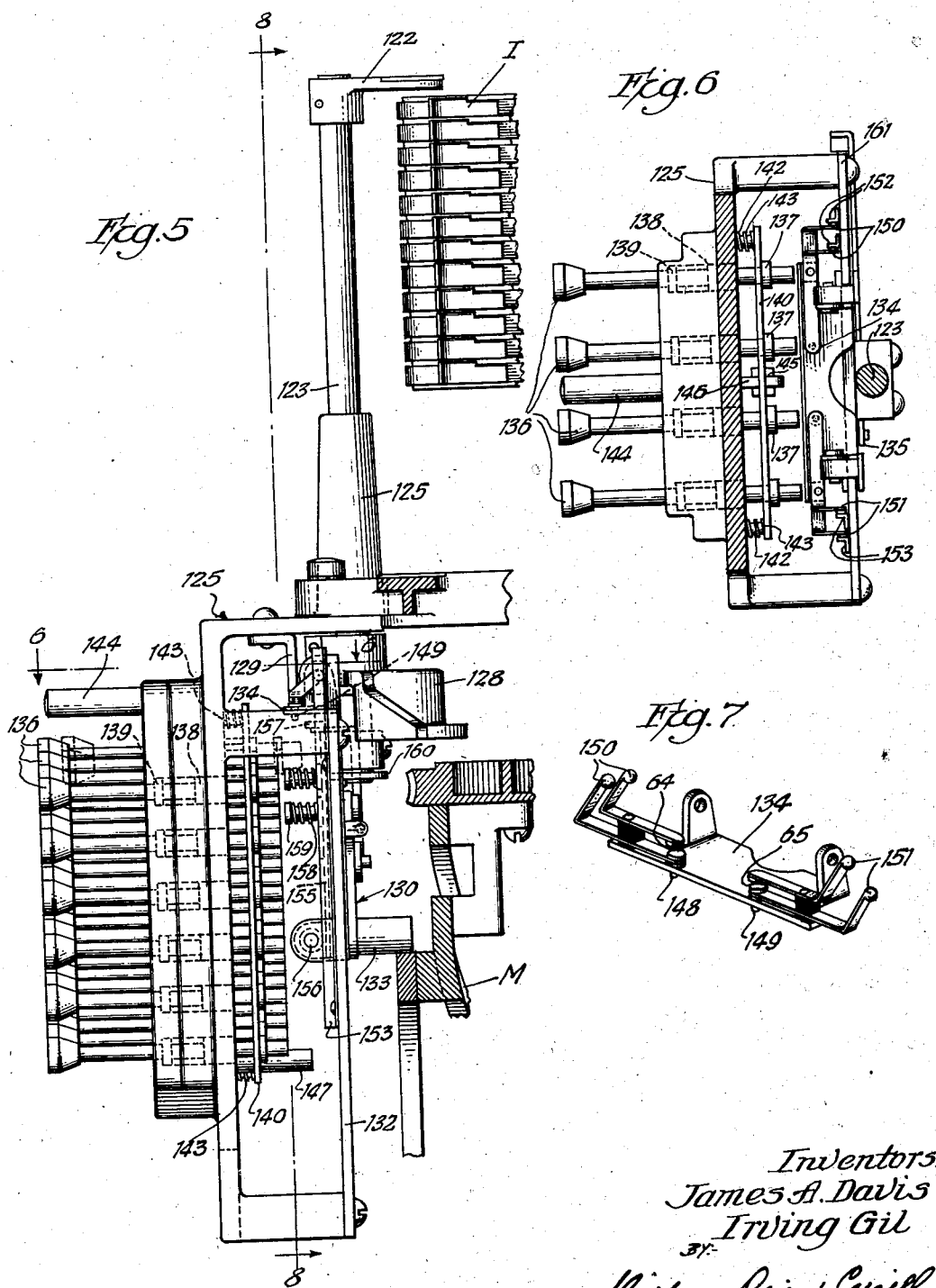

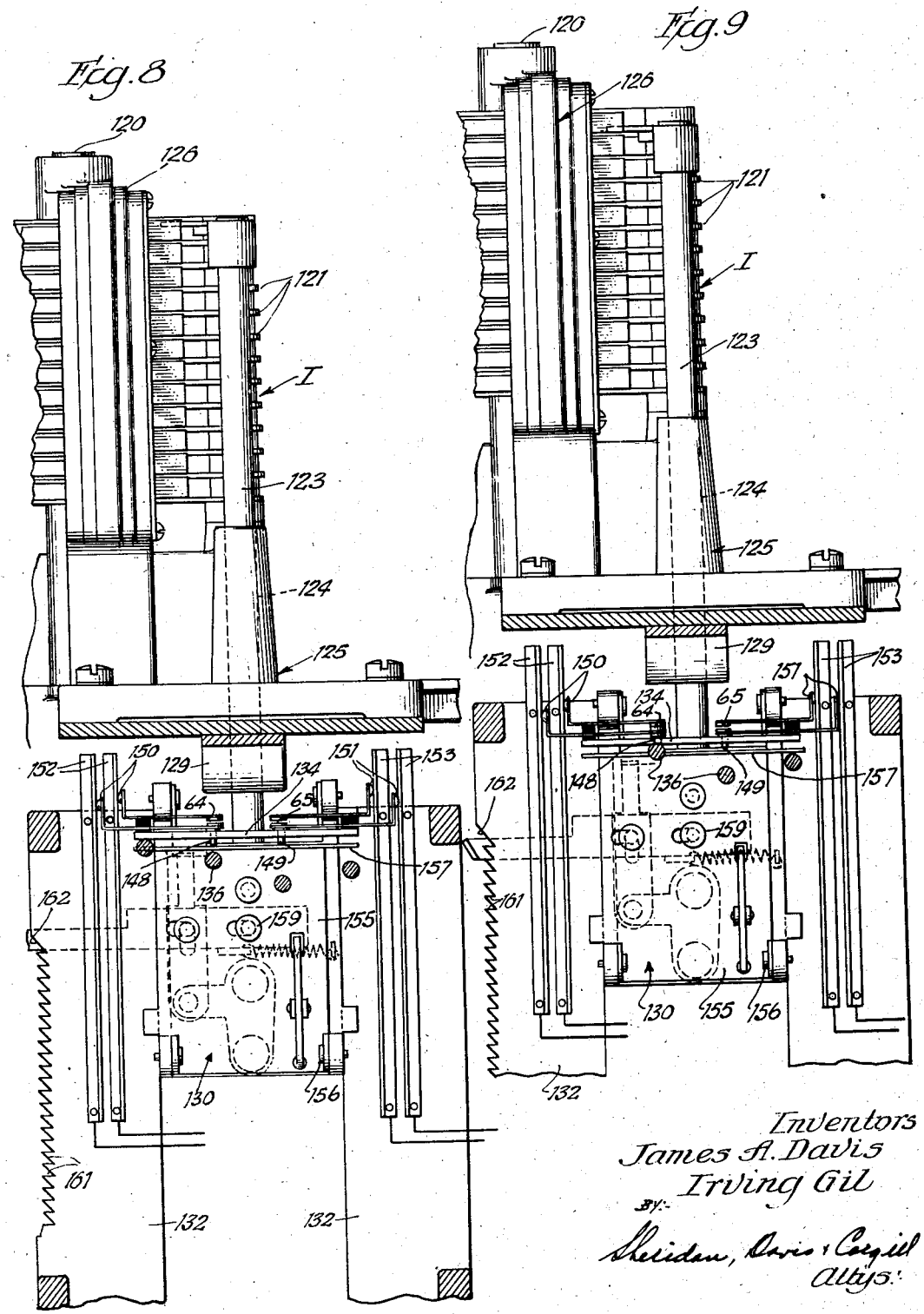

Jan. 11, 1944. J. A. DAVIS ET AL 2,339,062
PHONOGRAPH
Filed Nov. 4, 1940 10 Sheets-Sheet 7
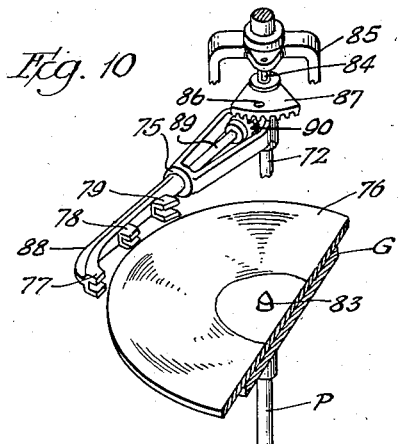
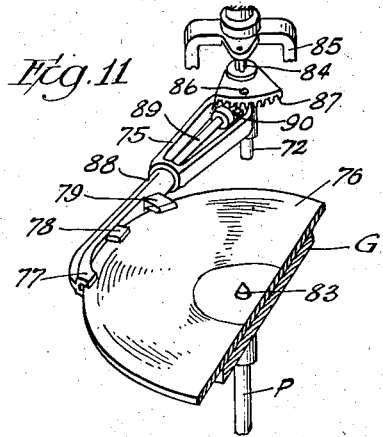
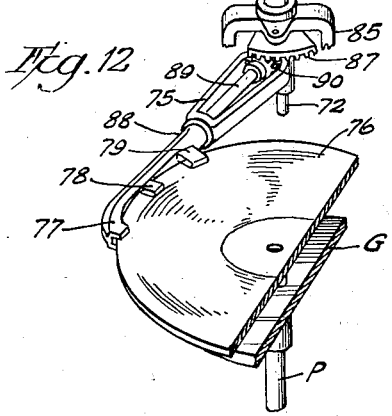
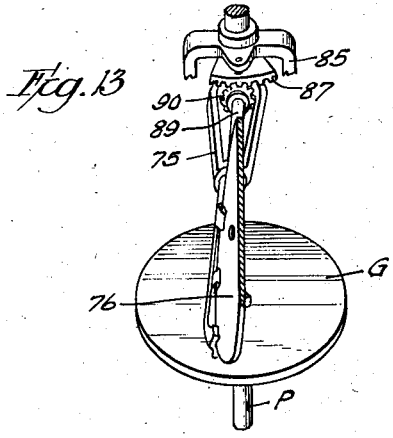
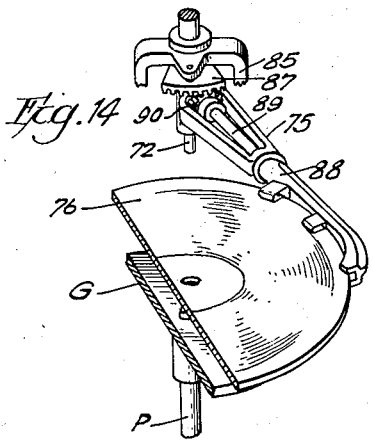
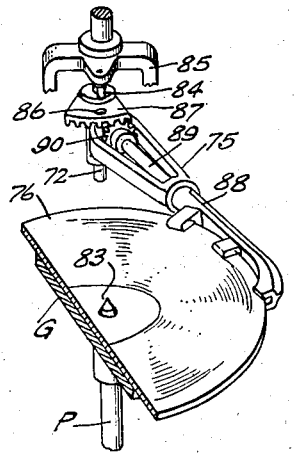
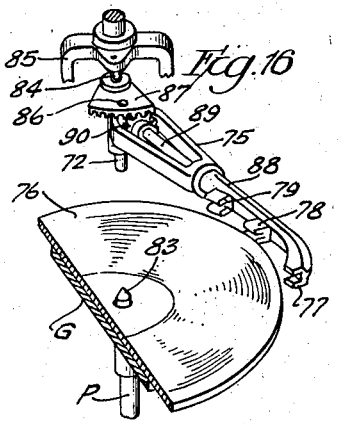
Inventors:
James A. Davis
Irving Gil
By:
Sheridan, Davis & Cargill
Attys:

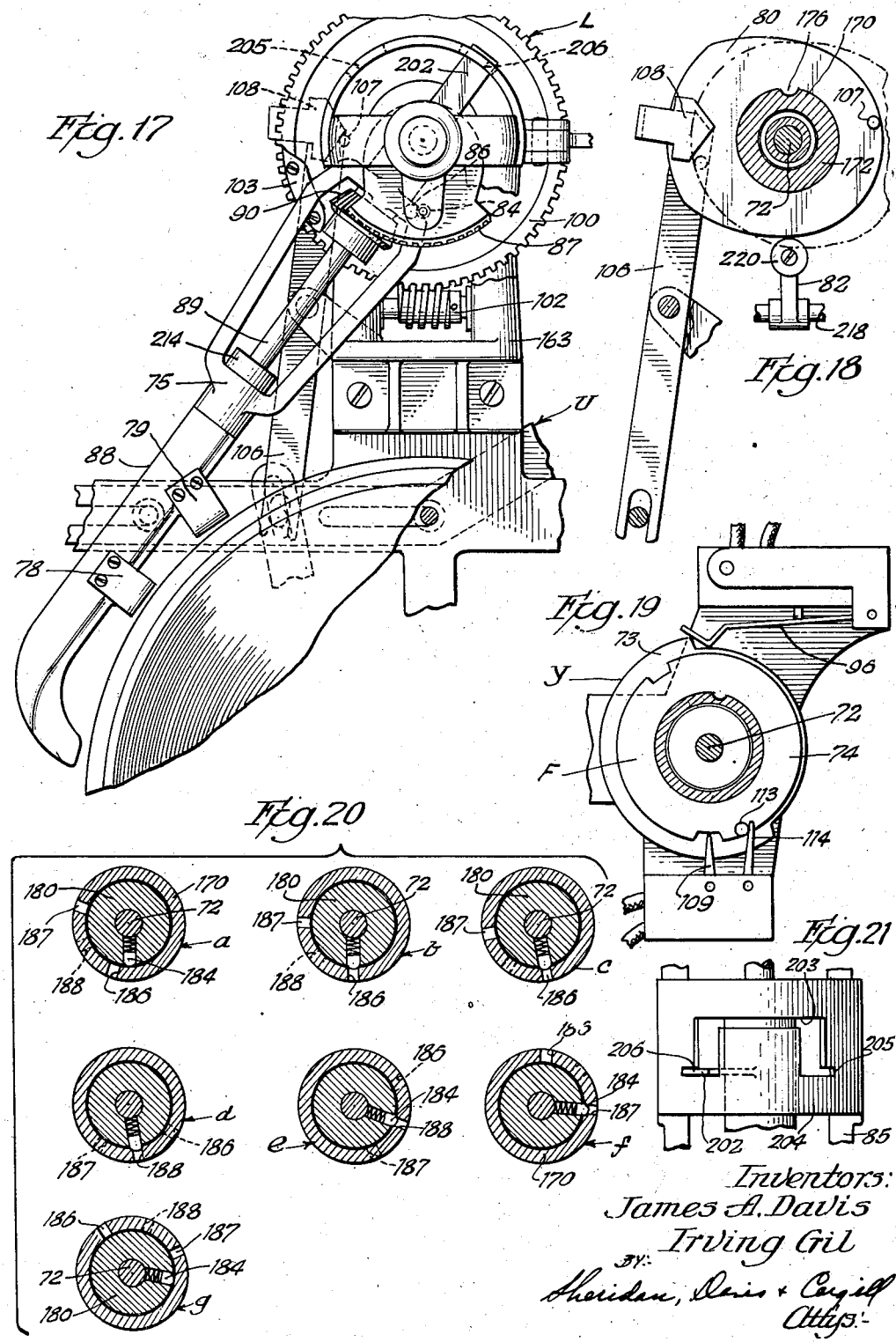

Jan. 11, 1944. J. A. DAVIS ET AL 2,339,062

PHONOGRAPH

Filed Nov. 4, 1940 10 Sheets-Sheet 9

Inventors:
James A. Davis
Irving Gil
By Sheridan, Davis & Cargill
Attys.

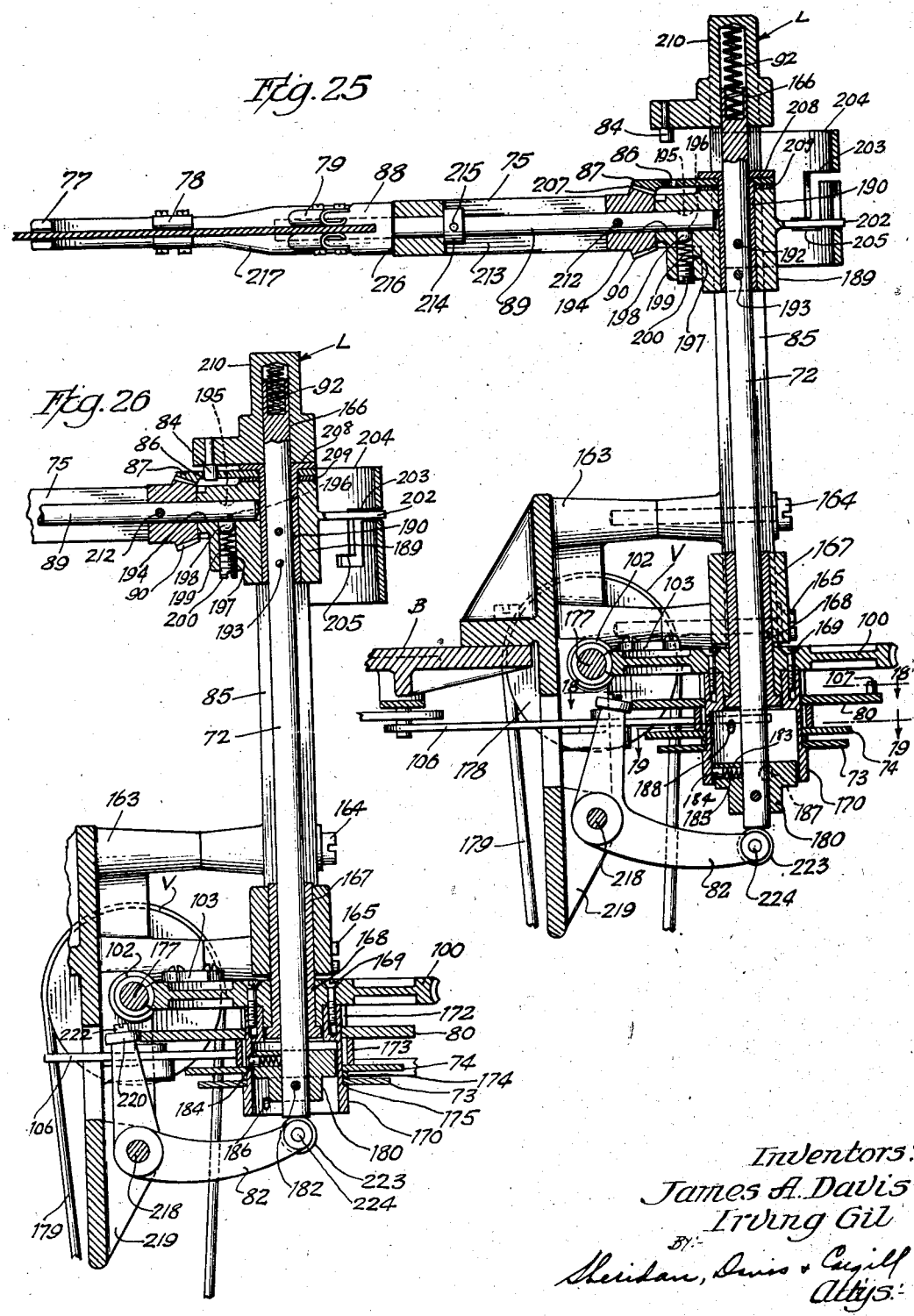

Patented Jan. 11, 1944

2,339,062

UNITED STATES PATENT OFFICE 2,339,062

PHONOGRAPH

James A. Davis, Highland Park, and Irving Gil, Chicago, Ill., assignors to Rock-Ola Manufacturing Corporation, Chicago, Ill., a corporation of Delaware Application November 4, 1940, Serial No. 364,136

16 Claims. (Cl. 274—10)

This invention relates to phonographs, and more particularly to automatic multi-record phonographs for selectively reproducing either side of one or more of a plurality of records.

It is an object of this invention to provide an automatic multi-record phonograph having a mechanism which will not only selectively reproduce any one or more of a plurality of records, but will also selectively reproduce either side of the selected record or records.

Another object of this invention is to provide an automatic multi-record phonograph including an improved record selector and selector control.

Another object of this invention is to provide an improved record gripping and turning mechanism for performing a part of the record selecting operations of an automatic phonograph and effecting control of the side of the record which faces the reproducing means.

Another object of this invention is to provide controlled means for optionally turning and thereafter reproducing either side of a double faced record in a multi-record phonograph in which the phonograph turntable moves cooperatively with respect to individually movable record carriers.

Another object of this invention is to provide an automatic multi-record phonograph including a turntable which is movable during the selection of a record and means for optionally turning the selected record for reproduction of either face thereof, and in which the turning of a selected record occurs in predetermined and timed sequence with respect to the movements and positions of the turntable.

Another object of this invention is to provide an improved method of automatically turning over a record in an automatic phonograph.

Other objects and advantages of the invention relates to various features of construction and arrangement of parts which will be apparent from a consideration of the following specification and accompanying drawings, wherein Figure 1 is a vertical cross section view of a phonograph embodying a preferred form of the present invention;

Figure 3 is a fragmentary cross sectional view taken substantially along a line 3—3 of Figure 1 drawn to a different scale and looking in the direction of the arrows;

Figure 4 is a fragmentary front sectional view of a portion of the record changing and selecting mechanism of the phonograph shown in Figure 1;

Figure 5 is a fragmentary side sectional view of a portion of the record changing and selecting mechanism of the phonograph shown in Figure 1;

Figure 6 is a fragmentary sectional view of a portion of the apparatus shown in Figure 5 with the section taken substantially on a line 6—6 of Figure 5 and looking in the direction of the arrows;

Figure 7 is a perspective view of certain parts of the apparatus shown in Figures 5 and 6;

Figures 8 and 9 are fragmentary sectional views with the section taken substantially on a line 8—8 of Figure 5 looking in the direction of the arrows and showing different operating positions of certain parts of the apparatus;

Figures 23, 24:
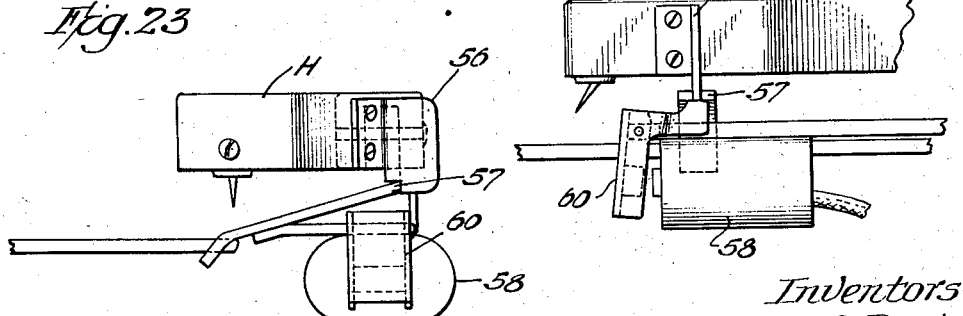

Figures 10 to 16, inclusive, are fragmentary views of a portion of the record turning mechanism of the phonograph shown in Figure 1 which illustrate various steps of the record turning operation;

Figure 17 is a fragmentary top view of a portion of the mechanism illustrated in Figure 3;

Figure 18 is a fragmentary sectional view with the section taken substantially on a line 18—18 of Figure 24 and in the direction of the arrows;

Figure 19 is a fragmentary sectional view with the section taken substantially on a line 19—19 of Figure 24 and in the direction of the arrows;

Figure 20 comprises a group of sectional views of a portion of the apparatus shown in Figures 24 and 25 which illustrate the sequence of operation of said portion of the apparatus;

Figure 21 is a fragmentary elevation showing certain details of construction and assembly of the apparatus shown in Fig. 17.

Figure 22:
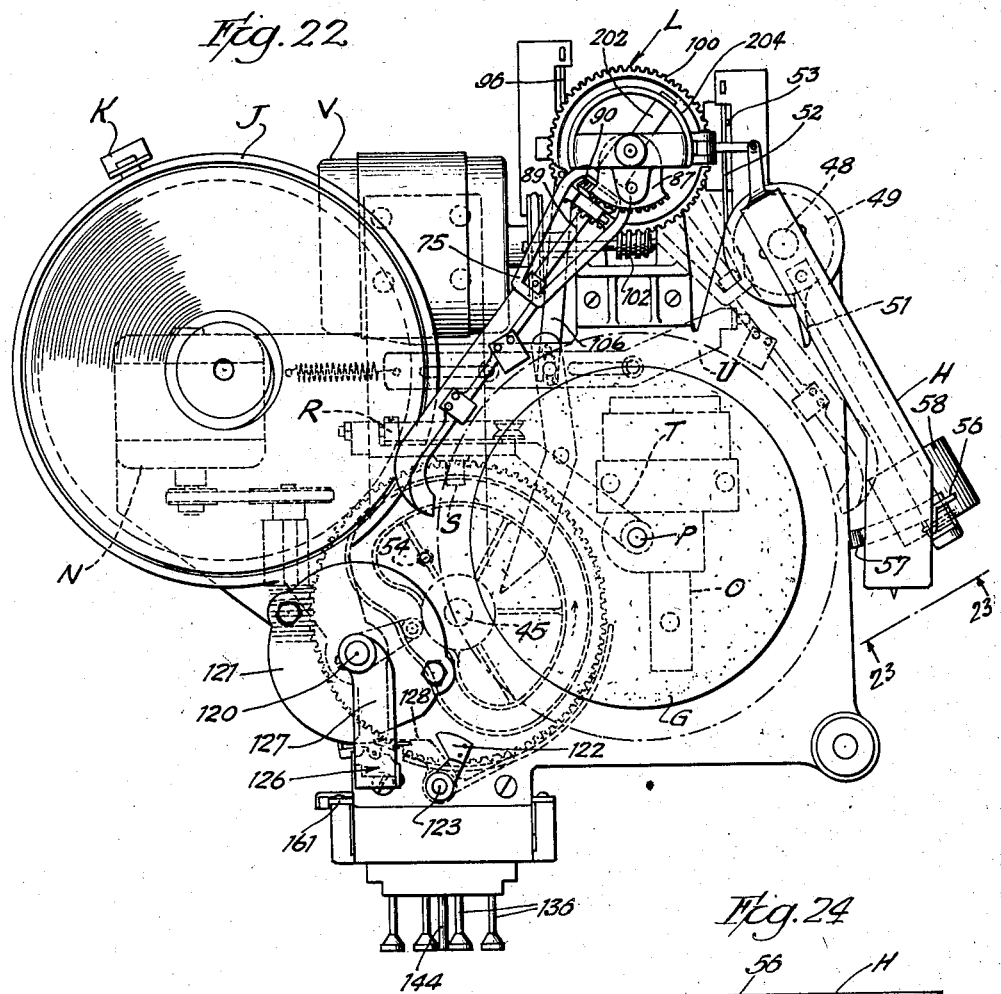

Figure 22 is a top view of the record selecting, changing and turning mechanism of the phonograph shown in Figure 1;

Figure 23 is a fragmentary detailed view of a preferred pick up and holder therefor which view is taken substantially on a line 23—23 of Figure 22·

Figure 24 is a fragmentary side view of the pick up and holder therefor which are illustrated in Figure 23;

Figures 25 and 26 are fragmentary side sectional views of the record turning mechanism illustrated in Figure 17 which illustrate different operating positions of the parts of said turning mechanism.

The illustrated phonograph is of the general type and has a considerable portion of the same structure as that illustrated in United States Letters Patent of Paul H. Smyth, Jr., No. 2,159,834. The phonograph disclosed herein is an improvement of that shown in the said Smyth patent in that upon proper preselection this phonograph will effect reproduction of either side of the selected record, while the phonograph disclosed in the Smyth patent can only effect the reproduction of one side of a selected record. Since certain elements, assemblies, and arrangements of the phonograph have been described in the above mentioned Letters Patent, those elements, assemblies and arrangements will be more generally described herein.

For clarity in the explanation and understanding of this phonograph, certain general definitions of assemblies and cooperating parts will be utilized and are as follows:

The record reproducing means shall be understood to include the tone arm, amplifier, sound reproducer, and such parts which are necessary for the reproduction of a record. The record changing mechanism shall be understood to include the record selecting and delivering mechanism which selects and delivers a preselected record to the reproducing means for reproduction. The record selector and selecting mechanism shall be understood to include the part of the record changer which accomplishes the selection of a predetermined or preselected record to be delivered by delivery means to the reproducing means. The record preselecting or selector control shall be understood to include the manually operated elements and associated structure by which records are preselected. The record turning mechanism, which in certain instances comprises a part of the record changing mechanism, shall be understood to include that portion of the mechanism which turns a preselected record so as to reverse the side or face of the record which is adjacent the tone arm or pick up.

General

As illustrated in Figure 1, the phonograph comprises a casing or cabinet A of suitable construction for accommodating a chassis or frame B, amplifier C and loud speaker or sound reproducer D.

The chassis B is adapted to serve as a mounting means for the record carrying and reproducing device which, generally considered, cooperate to translate the impulses which are recorded on a record.

Figure 2:
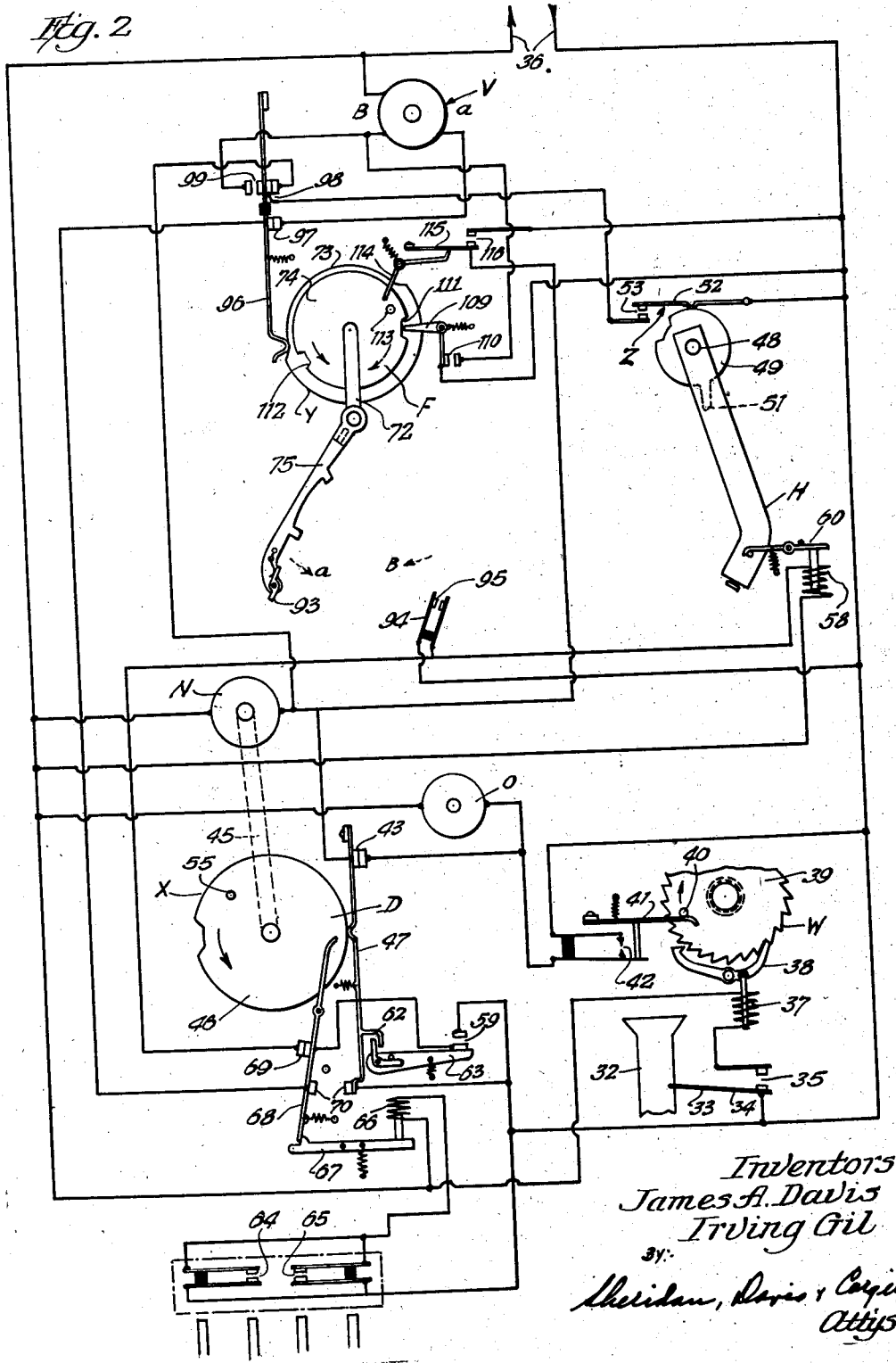
Figure 2 is a schematic circuit diagram of a preferred form of control system for effecting the operation of the phonograph shown in Figure 1.

As shown in Figures 1 and 2, the chassis B includes a mounting panel E, which is commonly referred to as a motor board having an aperture F therein and carries above the mounting panel a turntable G; record playing or reproducing means H; a record carrier supporting or mounting assembly I; a plurality of pivoted ring-shaped record carriers or trays J arranged one above another in column or stack relationship and swingable to and from cooperative relation with the turntable G; a member K which provides individual supports for each of the record carriers J when the record carriers are in their normal position in the stack; and a record turning mechanism L.

Below the mounting panel E, the chassis B carries a master cam M; the driving means N for driving the cam M; turntable rotating means O engaging a shaft P, which carries at its upper end the turntable G and which is movable toward and away from the reproducing means H; a reciprocable slide R having a cam follower S and turntable reciprocating arm T; cam operable reproducer means U returning the record reproducing means H to its starting position upon the completion of a playing of a record; record turning mechanism driving means V and control devices, which are generally designated as W, X, Y, and Z.

Phonographs of the class to which this invention is particularly adapted are generally, but not necessarily, controlled by coin operated means such as the coin feed receiver or slide 31 which delivers a coin to a coin slide or chute 32. The coin operated means comprises a switch arm 33 (shown in Figure 2) swingable about a pivot 34 when engaged by a coin in the slide 32. This effects closure of the contacts 35. The contacts 35 control an electrical circuit from a suitable source of electrical energy which is connected to leads 36, and thus energize an electromagnet 37 on the control device W to eject operation of a pawl 38 which in turn actuates a ratchet 39. A pin or stud 40 on the ratchet 39 normally engages a switch operating arm 41 for holding switch contacts 42 open. When the ratchet 39 is actuated by the pawl 38, it releases the switch operating arm 41 and permits the contacts 42 to close. The closing of the contacts 42 closes a circuit from the source of electrical energy to the turntable rotating means O to cause rotation of the turntable G.

The closing of the contacts 42 also closes a circuit from the source of electrical energy to the cam driving means N through normally closed contacts 43 of the control device X. The master cam M is rotated by the cam driving means N and drives its shaft 45 as well as the notched disk 46 of the control device X. The rotating master cam M engages the cam follower S to raise the reciprocable slide R which carries with it the turntable reciprocating arm T. This raises the rotating turntable G. If one of the record carriers J is in position for cooperation with the upwardly moving turntable, the turntable passes through that record carrier and removes the record therefrom. The turntable then continues its upward movement to bring the record into playing engagement with the record reproducing means H.

When the master cam M has rotated sufficiently to bring the turntable G into playing position, the shaft 45 has rotated the notched disk 46 to a position such that the notch therein registers with a cam portion of a switch operating arm 47. Since the switch operating arm 47 is biased toward the notched disk 46, the registry of the notch with the cam portion of the switch arm permits the normally closed contacts 43 to open. The opening of the contacts 43 opens the circuit to the cam driving means N. The cam M ceases to rotate and the reproducing means H reproduces the record on the turntable G.

In reproducing a record the reproducing means H swings inwardly on the record toward the center thereof. This movement of the reproducing means H rotates a shaft 48 and drives a notched disk 49 which is carried by the shaft 48. The notched disk 49 constitutes a part of the control device Z and has a projection 51 thereon, which swings with the reproducing means H and notched disk 49 toward the cam operated reciprocating means U during the reproduction of a record.

When the playing of a record is completed by the reproducing means H, the shaft 48 has rotated the notched disk 49 of the control device Z until the projection 51 is adjacent the reproducer return means U and the notch in the disk 49 has registered with a cam portion of switch arm 52 which controls the normally open switch contacts 53. Upon such registration of the cam portion of the switch operating arm 52 with the notch in the disk 49 of the control device Z, the normally open switch contacts 53 close to thereby close a circuit from the power source to the cam driving means N. This effects rotation of the master cam M and its shaft 45.

When the rotation of the master cam M is thus resumed, the cam follower S, which is engaged by the cam track and the slide R, which carries the follower S, are moved by the cam in a direction to cause the turntable reciprocating arm T to move the turntable G away from the reproducing means H and back through the positioned record carrier J to deposit the reproduced record thereon. The reproduced record has thus been moved out of playing engagement with the reproducing means H. A pin or stud 54 (Figure 22) on the rotating master cam M engages the reproducer return means U and actuates it to swing the disk 49 by engagement with the projection 51. This returns the reproducing means H to its starting position.

During the rotation of the disk 49 in the return movement of the reproducing means H, it cams the switch arm 52 to open the contacts 53. This opening of the contacts 53 does not, however, result in the stopping of the cam driving means N because before they are opened the rotation of the master cam M and the shaft 45 have caused sufficient rotation of the notched disk 46 of the control device X to move the notch in that disk out of registration with the cam portion of switch operating arm 47. This rotation of the disk 46 causes the switch contacts 43 to close a power circuit to the cam driving means N before the contacts 53 are opened. The cam driving means N consequently continues to drive the cam means M and its shaft 45 and also to rotate disk 46. When the rotating master cam M has completed its movement of the cam follower S, the slide R and the turntable reciprocating arm T, the turntable is returned to its normal position of rest. When the turntable is returned to its normal position of rest, a pin or stud 55 on the rotating disk 46 of the control device X engages a suitable pawl structure (not shown) to effect a single notch return movement of the ratchet 39. If the ratchet 39 has been moved only one notch by the deposit of a single coin, this return movement effects reengagement of the switch operating arm 41 by the pin or stud 40 to reopen the contacts 42 and thereby stop the rotation of the turntable rotating means O and the cam driving means N. The cycle of operation may be repeated by the subsequent deposit of an additional coin and will repeat itself if an additional coin has been deposited during the reproduction of the preceding record.

The operation of the phonograph, which has been thus far described, presupposes the preselection of a side of one of the records in the stack, which is normally facing upwardly toward the reproducing means H in the stack. This much of the operation is quite similar to that described in the previously mentioned Smyth patent, No. 2,159,834. In the present phonograph, however, as will be more clearly understood from the description of the additional operation of the present phonograph, it is desirable that the reproducing means H is held in a normal position away from the turntable G and a record which is carried thereby until such selected record is in proper position for reproduction of the selected side of that record. To accomplish this holding of the reproducing means H away from the record surface between the reproductions of records and during the record selecting operations, the reproducing means H has a notched bracket 56 secured thereto, which engages the outer end of a slide 57 to provide a rest and holding means for the reproducing means. The reproducer return means U effects the placement of the reproducing means H in this position of rest after the reproduction of each selected record, the position of rest being illustrated in Figures 23 and 24. After the selection of a predetermined record in the manner which has been described and in the additional manner which will be described, a circuit is closed to an electromagnet 58 through the normally open contacts 59 to actuate an armature 60 and thereby effect the release of the reproducing means H. The armature 60 is preferably in the form of a pivotally supported bell crank as shown in Figure 23 and raises the reproducing means H to release the notched bracket 56 from the edge of the slide 57 whereupon the reproducing means H descends by gravity to playing position with respect to the record with the bracket 56 sliding on the inclined surface of the slide 57. When the face of a record, which is normally faced upwardly in the record carrier, is selected for reproduction as has been described, the contacts 59 are closed when the notch in the disk 46 registers with the cam portion of the switch operating arm 47. The resulting movement of the switch operating arm 47 causes a catch 62 which is secured thereto to actuate a switch operating arm 63 to thereby close the contacts 59. The contacts 59 are reopened upon continued movement of the disk 46 which is driven by the cam driving means N after the reproduction of the selected record.

The preselection for reproduction of the side of a record, which is normally faced downwardly or away from the reproducing means in the record carrier, necessitates and involves many of the same record selecting operations which have been described with respect to the selection and reproduction of the upper face of a record. The deposit of a coin in the coin feed receiver or slide 31 results in the energizing of the electromagnet 37 and the consequent actuation of the ratchet 39 to close the contacts 42 and thereby start the turntable rotating means O and cam driving means N. However, in making the preselection of the face of a record, which is normally faced downwardly in a record carrier, one of a pair of switches 64 or 65 is closed as will be more fully described in the description of the record preselecting means. The closing of either of the switches 64 or 65 closes a circuit from the power source to an electromagnet 66 which actuates a latch element 67 and thereby releases a switch operating arm 68 for movement which opens the contacts 69 and prevents closure of the circuit to the reproducing means release magnet 58 through those contacts. This prevents the reproducing means release magnet 58 from being energized to release the reproducing means when the notch in the disk 46 registers with the cam portion of the switch operating arm 47. The operation of the cam driving means N upon the closure of the contacts 42 effects the same operation of the master cam M and the rotation of the disk 46 until the notch in the disk 46 registers with the cam portion of the switch operating arm 47 as previously described for raising the turntable and effecting the placement of a record on the turntable. The position of the pin or stud 55 on the disk 46 is such that it does not effect relatching of the switch arm 68 with the latch element 67 while the disk is turning to a position of registry of the notch with the cam portion of arm 47.

The registry of the notch in the disk 46 with the cam portion of the switch operating arm 47 opens the circuit to the cam driving means N and also closes a circuit from the power source to the record turning mechanism driving means V through contacts 70 which were partially positioned for closure by the release of the latch element 67. The sequence of operations effected by the record turning mechanism driving means V can be generally followed by reference to Figures 10 to 16 inclusive as well as to the circuit diagram in Figure 2. The driving means V rotates a shaft 72 upon which cams 73 and 74 and a record turning arm 75 are mounted for rotation therewith.

Although the detailed mechanisms for effecting operation of the record turning mechanism will be more fully described, they are set forth generally here to establish the sequence of operations and the controls for effecting this general sequence. The preliminary movement of the driving means V rotates the shaft 72 to swing the arm 75 toward a record 76 on the turntable G from a normal position of rest in which the arm 75 is spaced from the periphery of the record. This movement of the arm is illustrated in Figures 10 and 11. At the inner limit of this movement record grippers 77, 78, and 79, which are secured to the arm 75 and which preferably are in the form of clips, engage and clip the margin of the record as illustrated in Figure 11. At this stage of the movement of the shaft 72 a cam 80 which is driven with the shaft 72 cooperates with the rotatably supported bell crank 82 to raise the shaft 72, arm 75, and record 76 vertically until the record clears the stud or locating pin 83 on the turntable as illustrated in Figure 12. At this upper limit of the movement of the shaft 72, a pin or stud 84, which is secured to a stationary supporting frame 85 fits into an opening 86 in a rack 87 which is rotatably mounted on the shaft 72. The engagement of the pin 84 with the opening in the rack 87 prevents the rack from rotation with the shaft 72.

The record turning arm 75 includes a rotatably supported portion 88 upon which the record clips 77, 78, and 79 are mounted and has a rotatably supported shaft portion 89 to which a pinion gear 90 is drivingly connected. The teeth on the pinion gear 90 mesh with the cooperating teeth on the rack 87. Continued rotation of the shaft 72 after the record has been raised to the position shown in Figure 12 and after the position of the rack 87 has been determined by engagement with the pin 84 effects rotation of the rotatable portion of the record turning arm 75 to rotate the record about an axis at or near the gripped margin thereof as that gripped margin is swung through an arcuate path by the swinging movement of the arm 75. Since the rack is stationary, the pinion gear 90 is driven by the rack during the swinging movement of the arm 75. The size and design of the pinion gear 90 is such that the record is turned over or rotated through 180 degrees about the gripped margin thereof, while the arm 75 is swinging across the axis of the turntable to a position such that the locating opening in the record is in alignment with the pin or stud 83 on the turntable. The turning of the record is illustrated in Figures 12, 13, and 14.

After the record has thus been turned over, the shaft 72 and turning arm 75, together with the rack 87, are moved downwardly by a compression spring 92; the downward movement of the shaft by the spring 92 being permitted by the cam 80 and cooperating bell crank 82. This downward movement of the rack 87 effects disengagement of the rack from the pin or stud 84 so that the rack is again free to rotate with the shaft 72. This downward movement of the arm 75 replaces the record on the turntable G with the locating pin or stud 83 engaging the locating opening in the record. After replacement of the record on the turntable, the continued rotation of the shaft 72 swings the arm 75 to cause the release of the record by the grippers 77, 78, and 79.

Near the end of the swinging movement of the arm 75 a rotatably supported element 93 on the end of the arm 75 engages a resilient arm on a switch 94 to close contacts 95 and thereby close a circuit from the power source to the reproducing means release magnet 58. This releases the reproducing means for movement to playing position with respect to the positioned record.

Also near the end of the movement of the shaft 72 and record turning arm 75, the cam 73 of the control device Y actuates a switch operating arm 96 to open contacts 97 and thereby open the power circuit to the driving means V. This actuation of the switch operating arm 96 also opens contacts 98 and closes contacts 99 to establish proper connections to the driving means V for effecting movement of the driving means V in a reverse direction upon reenergization.

The reproduction of the record swings the reproducing means H inwardly and at the end of this inward movement of the reproducing means the cam portion of the arm 52 registers with the notch in the disk 49 to close the normally open contacts 53 and thereby close a circuit from the power source to the driving means V through the contacts 99. This starts the driving means V in a direction reversed to that in which it was last operated. The cam driving means N is not started at this time because the circuit thereto is opened by the contacts 98. The driving means V drives a gear 100 through a cooperating worm gear 102, which in turn drives the shaft 72. At the start of the reverse movement of the driving means V a cam element 103, which is secured to the gear 100, as shown in Figure 24, engages an end of a rotatably supported bell crank 104 to move the bell crank. A cable 105 connects the end of the bell crank to the end of the reproducing means H away from the needle so that the movement of the bell crank which is effected by the cam element 103 lifts the reproducing means H and the needle carried thereby vertically away from the record which has been reproduced. After the reproducing means has been thus raised away from the surface of the reproduced record, movement of the reproducer return means U is effected by an actuating arm 106 (Figure 18), which is actuated by a pin or stud 107 which is secured to the cam 80 and engages a cam portion 108 of that actuating arm. This returns the reproducing means H to its position of rest away from the record before the return movement of the record is commenced.

The return of the reproducing means H to its position of rest reopens the starting circuit to the driving means V. However, before the contacts 53 are opened and before the movement of the cam 73 of the control device Y has permitted the contacts 99 to be reopened, the cam 74 actuates a switch 109 to close contacts 110 and thereby establish an operating circuit to the driving means V. The switch 109 has an arm which is adapted to register with notches 111 and 112 in the cam or disk 74. During the rotation of the disk 74 in the counterclockwise direction, as viewed in Figure 2, which occurs during the original turning of the record, the contacts 110 are held open by the cam or disk 74. However, when the record has been originally turned over, the arm of the switch 109 registers with the notch 112 and upon return movement of the cam 74 the contacts 110 are held in the closed position by the cam until the cam has again reached its normal position of rest at which the arm of the switch 109 again registers with the notch 111. This opens the reversed operating circuit to the driving means V to stop the operation thereof. During the reversed rotation of the driving means V the sequence of operations of the record turning arm is the opposite of that which was previously described and the opposite of that illustrated in Figures 10 to 16 inclusive. The reproduced record is thus replaced in its original position on the turntable G. Near the end of the return turning movement of the reproduced record a pin or stud 113 on the cam or disk 74 engages an actuating lever 114 of a switch 115 to close the normally open contacts 116.

The closing of the contacts 116 closes a starting circuit from the source of power to the cam driving means N. After the cam driving means N has been thus started, the operating circuit thereto for the return of the record carrier and turntable is closed through the contacts 43 by the rotation of the notched disk 46 which removes the notch in the disk 46 from registry with the cam portion of the switch operating arm 47. Since the one of the switches 64 or 65 which was closed for the selection of the record was opened by the selecting means upon the selection of the record, as will be more fully described, the movement of the notched disk 46 during the return of the record carrier and turntable effects engagement of the pin or stud 55 with the switch operating arm 68 to reestablish the latched engagement of that latch operating arm with the latch element 67. The record carrier and turntable are returned to their normal positions as previously described and the circuits to the cam driving means N and the turntable rotating means O are opened in the described manner.

Record carrying means

In the phonograph disclosed herein the record carriers J are rotatably supported on a post 120 between successive disks 121 in the mounting assembly J. Each of the record carriers J is selectively swingable about the post 120 from a normal position in the stack to a position in alignment with the turntable G. The record carriers J are latched in the normal stacked relation by individually operable latches, said latches being operable selectively by a selector 122 which is carried at one end of a rotatably and longitudinably reciprocable shaft 123. The shaft 123 is journalled at 124 in a selector control frame 125; the selector control frame 125 being secured to the chassis or frame B. Upon operation of the selector 122, a particular record carrier is selected by longitudinal movement of the shaft 123 to a particular level and rotary movement of the shaft 123 effects the release and swinging movement of the selected record carrier J for movement from the stack to a position in alignment with the turntable G.

The swinging movement of the selected record carrier is controlled by record carrier swinging means including a swingable yoke-like member 126. The yoke-like member 126 has an arm 127, which is secured to the post 120 and extends radially outwardly so that the yoke-like member extends around the stack assembly I and is rotatable with the post 120 clear of the stack. The yoke-like member 126 is driven by a suitable cam follower which follows a track in the master cam M to swing a selected record carrier toward the path of movement of the turntable in timed relation with respect to the turntable movement. The turntable G passes through the selected record carrier during the upward movement of the turntable to remove the record from the carrier. During the return of the record to the stack the turntable again moves through the record carrier to replace the record after which the carrier is swung back into the stack by the yoke-like member 126.

Record selecting means

A cam lever 128 is slidably mounted on the shaft 123 and held in a position above the master cam M by a bracket 129. The cam lever 128 is keyed to the shaft 123 so that the shaft is reciprocable through the cam lever, but rotary movement of the cam effects rotation of the shaft 123. This cam lever is actuated by a pin or stud on the master cam M after the selector shaft has been elevated to the desired level for selecting a preselected record to thereby rotate the shaft 123 and cause the selector 122 to release the latch which normally holds the preselected record in position in the stack.

The end of the shaft 123 opposite the selector 122 is rotatably secured to a slide plate structure 130, which is slidably mounted between guide rails such as 132. The slide plate structure 130 carries a cam roller 133 which cooperates with the master cam M to control the position of the slide plate structure 130 and the consequent longitudinal or reciprocable movement of the shaft 123. The master cam M normally holds the slide plate structure 130 in a position such that the selector 122 is above all of the record carrier latches during the time when the phonograph is not in operation. Upon starting the phonograph the master cam M permits the cam follower 133, slide plate structure 130 and shaft 123 to drop rapidly and silently to a position determined by the preselection of a record. The determination of the level of the selector 122 precedes the rotation of the shaft 123 and the selector to release a record carrier responsive to movement effected by the cam lever 128.

The selector control comprises operable means for stopping the selector 122 at the elevation of the latch of a preselected record, automatic means for restoring the operable means during the operation of a latch for a preselected record, automatic means for supporting the selector at the selected elevation after the operable means is restored and the selector frame 125 which includes the journal support for the shaft 123. To effect the stopping of the slide plate structure 130 and the selector 122 at the level corresponding to a preselecting record, a plate 134 is rotatably supported and swingably carried at the upper end of the slide plate structure 130. The rotation of the plate 134 is limited in one direction by a stop 135.

A plurality of rods 136 is reciprocably supported by the selector control frame 125. There are two of these rods for each of the record carriers J and they are movable one or more at a time to positions in the path of the downward movement of the plate 134 as that plate moves with the slide plate structure 130. Each of the rods 136 has intermediate its ends three spaced flanges 137, 138, and 139. The flanges 137 abut the surface of a plate 140 and the flanges 138 and 139 provide limiting stops for the longitudinal movement of the rods 136. The plate 140 is carried rearwardly of the selector frame 125 by pins 142 which project from the plate 140 at its corners and are slidably received in sockets in the selector frame 125. Coil springs 143 on each of the pins 142 bias the plate 140 away from the selector frame 125.

The rods 136 may be individually moved into the path of pivoted plate 134 by pushing them toward the selector frame 125. A cancelation rod 144 is slidably mounted in the selector frame 125 and is adapted to actuate a connecting element 146, which is connected to the plate 140 by pins 145 so that inward movement of the cancelation rod results in the return of all of the rods 136 which have been actuated for making selections. Upon release of the cancelation rod 144 the springs 143 return the plate 140 to its normal position and restore the connecting element and cancelation rod to their normal position.

As the slide plate structure 130 moves upwardly the plate 135 will engage the inner end or ends of any of the rods 136 which may have been pushed inwardly. The pivoted plate 134, however, will be rotated by engagement with the rods 136 during the upward movement so that the plate will not interfere with such upward movement. When the slide plate structure 130 moves downwardly, the pivoted plate 135 is in a horizontal position and will engage the uppermost rod 136, which has been actuated for selection to thereby arrest the downward movement of the slide plate structure 130 and selector 122. This stops the selector 122 at the elevation of the record carrier latch for a particular selected record. If none of the rods 136 has been operated, the plate 134 will be stopped just above the pin 147 at the lower end of the travel of the slide plate structure 130.

In the phonograph disclosed herein it is to be particularly noted that there are two of the rods 136 in a position such that a particular record carrier will be selected. One of the rods 136 for selecting each of the record carriers is in a position such that it engages the plate 134 near the outer end thereof. The other of the rods of each pair which selects one of the record carriers is disposed to be in alignment with an actuating button 148 or 149, which is adapted to close one of the switches 64 or 65 upon engagement with the rod 136. The switches 64 and 65 are carried by the plate 134 and have sliding contact elements 150 and 151 respectively, which engage corresponding contact rails 152 and 153 to connect the switches 64 and 65 into the circuit as shown in Figure 2 during the movements of the slide plate structure. As previously mentioned in the general description, the operation of the switches 64 and 65 by the rods 136 during the selection of a record prepares the electrical control device in the circuit of Figure 2 for turning the selected record over. The stopping of the slide plate structure and selector by a rod 136, which does not actuate one of the switches 64 or 65, effects the selection of a particular record without turning it over and consequently results in the reproduction of the side of the record which is normally faced upwardly toward the reproducing means in the record carrier.

For automatically restoring each rod 136 to its outer or non-selecting position after it has been effective to stop the selector at a desired elevation, a plate 155 is pivoted at 156 and has a forwardly extending edge 157 spaced just below the lower surface of the pivoted plate 134. When the slide plate structure and selector are stopped by engagement of the plate 134 with a particular rod 136, the edge 157 is in position to engage the projecting end of that rod 136. The plate 155 is biased away from the ends of the rods 136 by springs 158, which are held in position by pins 159 secured to the slide plate structure 130. A cam 160 is secured to the lower end of the shaft 123 so that rotation of the shaft 123 in response to actuation by the cam lever 128 rotates the cam 160 to move the plate 155 and edge 157 toward the selector frame 125 and thereby return the rod 136 to the normal or non-selecting position. This return of the effective selector rod 136 occurs at the time of the release of the record carrier latch by the selector 122.

For supporting the selector at any of its elevations after the rod 136 has been restored as described and until the selector is subsequently actuated by the master cam M, a rack 161 is provided at one edge of one of the guide rails 132. A reciprocable pawl, which is carried by the slide plate structure 130, cooperates with the rack 161 to engage one of the teeth on the rack and thereby support the slide plate structure and selector at the level at which it was stopped by a rod 136. During the upward movement of the slide plate structure the pawl slides over the teeth of the rack 160. At the upper position the pawl engages a cam surface 162 on the guide rail 132 and is releasably latched in a position in which it clears the teeth of the rack on the downward movement until released by the restoring of the effective rod 136. The upward movement of the slide plate structure and selector, after the selection and reproduction of each record, restores the parts to their normal positions.

Record turning means

The supporting frame 85 for the record turning means is secured to a support bracket 163 by screws such as 164 and 165 and the support bracket 163 is secured to and supported by the chassis B. The supporting frame 85 has a pair of journal bearings 166 and 167 which rotatably support the shaft 72. The journal bearing 167 also provides on its surface at 168 a bearing for rotatably supporting the gear 100. The gear 100 carries and has drivingly connected thereto by screws such as 169 a hollow sleeve member 170 which carries on its outer surface the cams 73, 74, and 80 so that they are driven by the rotation of the gear 100 and sleeve member 170. Spacing collars 172, 173 and 174 are disposed between the gear 100 and the cams 80, 74, and 73 for establishing the proper spacing of the cams with respect to a shoulder 175 on the sleeve member 170. As shown in Figure 18, it is also preferable that the cam 80 is keyed to the outer surface of the sleeve member 170 as at 176.

The gear 100 is driven by the cooperating worm gear 102 which is secured to a shaft 177, which shaft is rotatably supported in a bearing in the bracket 163. The shaft 177 has a driving pulley secured thereto, which is preferably driven by a belt 179 from the record turning mechanism driving means V. A collar 180 is drivingly connected to the shaft 72 by a pin 182 and is disposed within the hollow sleeve member 170. This collar 180 has a radial opening 183 therein which slidably carries detent 184, which detent is biased outwardly and into engagement with the inner surface of the sleeve 170 by compression spring 185. The detent 184 is adapted to register with openings 186, 187, and 188 in the wall of the sleeve member 170 at various stages of the movement of the shaft 72 to provide a driving connection for effecting rotation of the shaft 72 from the driven sleeve 170.

A collar 189, having an inner sleeve 190, is secured to the shaft 72 by pins 192 and 193. A projecting portion on the collar 189 provides a journal bearing 194 for rotatably supporting one end of the shaft 89. The axis of the shaft 89 is substantially perpendicular to the axis of the shaft 72. The shaft 89 preferably has recesses 195 and 196 on opposite sides thereof within the bearing 194 and in alignment with an opening 197 which extends radially outwardly from the shaft 89 and has a detent 198 slidably mounted therein and biased toward the shaft by a compression spring 199, which is held in place in the opening by a threaded plug 200. An arm 202, which is preferably integral with the collar 189 projects outwardly from the collar and extends into a guide slot 203 in a substantially semicircular member 204 which is secured to the supporting frame 85. The guide slot 203 is substantially in the shape of an inverted U with outwardly extending end portions 205 and 206. This guide slot insures the proper path of travel of the shaft 72 and record turning arm 75.

The rack 87 having arcuately disposed, bevelled gear teeth 207 is rotatably mounted on the sleeve 190, which sleeve has an end flange 208 for holding the rack in position with respect to the collar 189. The friction washer 209 is preferably disposed between the rack 87 and the collar 189. A hollow cap 210, which is secured to the supporting frame 85 provides an end cover for the shaft 72 and a housing for enclosing the compression spring 92 which biases the shaft 72 downwardly.

In the record turning arm 75 the pinion 90, which has teeth cooperably meshing with the teeth of the rack 86 is secured to the shaft 89 by a pin or suitable fastening means 212. This record turning arm has a projecting portion 213 which provides a rotatable support for the shaft 89 and is preferably integral with the collar 189. A collar 214, which is secured in position on the shaft 89 by a set screw or suitable fastening means 215, together with a shoulder 216 on the projecting end portion 217 of the record turning arm, axially locate the shaft 89 and projecting portion 217 and prevent end-wise movement thereof. The projecting end portion 217 of the record turning arm has the record grippers 77, 78, and 79 secured thereto and is preferably curved so that the displacement of the grippers substantially conforms to the curvature of a record of the size with which the turning mechanism is adapted to be used.

The bell crank 82 is rotatably supported by a shaft 218 on a projecting portion 219 of the bracket 163. A roller 220 is rotatably secured to one end of the bell crank 82 by a screw or suitable fastening means 222 and is adapted to ride against the cam surface of the cam 80. A roller 223 is rotatably secured to the other end of the bell crank 82 by a screw or suitable supporting means 224 and is adapted to engage the lower end of the shaft 72.

Referring particularly to Figures 17, 20, 21, 24, and 25, the normal position of rest of the record turning arm 75 during the intervals between the selection of records is such that the arm 202 is disposed in the extending end portion 206 of the guide slot 203 and the detent 184 rests against the inner surface of the sleeve member 170 out of alignment with any of the openings in that sleeve member. During the preliminary movement of the gear 100 and sleeve 170 responsive to the operation of the turning mechanism driving means V, the sleeve 170 is rotated from a position such as that indicated in view a of Figure 20 to that indicated in view b where the detent engages the inner end of the opening 186. Upon engagement between the detent 184 with the inner end of the opening 186, the shaft 72 is moved angularly to a position such as that indicated in view c of Figure 20. During this movement the record turning arm 75 is moved inwardly to grip the edge of the record as indicated in Figures 10 and 11, and the arm 202 is moved inwardly to a position such that its engagement with the semicircular member 204 stops the rotary movement of the shaft. Upon reaching this stage of the movement the shaft 72 is moved axially by the cooperating cam 80 and bell crank 82 and the detent 184 is moved axially within the sleeve 170 until it engages the inner end of the opening 188, as shown in view d of Figure 20. The axial movement of the shaft 72 moves the arm 202 to the top of the guide slot 203. After engagement of the detent 184 with the opening 188 the shaft 72 is again rotated to a position such as that shown in view e of Figure 20 and the arm 202 is moved to the other side of the guide slot 203. During this rotary movement of the shaft 72 the rack 87 is held stationary by engagement with the pin 84 so that in addition to the arcuate or swinging movement of the turning arm 75, the shaft 89 and projecting end portion 217 of the turning arm are rotated 180°.

At the beginning of the rotary movement of the shaft 89 the detent 198 engages the recess 195 and at the end of this rotary movement the detent 198 engages the recess 196. The recesses 195 and 196 in the shaft 89 provide insurance that the rotation of the shaft will be the desired 180° and also that the shaft will not continue to rotate due to the weight of the gripped record on one side thereof. During this rotation and arcuate movement of the record turning arm 75 the arm and record are moved from the position shown in Figure 12 through that indicated in Figure 14. After such rotary movement of the shaft 72, the cam 80 and bell crank 82 release the shaft 72 for axial movement, which is effected by the biasing force of the compression spring 92. This axial movement again moves the arm 202 downwardly in the guide slot 203 and moves the shaft 72 with respect to the sleeve 170 to a position such that the detent 184 engages the inner end of an opening 187 as indicated in view f of Figure 20. After engagement of the detent 184 with the inner end of the opening 187, the shaft 72 is again rotated to a position, such as that indicated in view g of Figure 20, during which movement the grippers release the margin of the record. After the reproduction of a record which has thus been turned over, the record is again turned with the operations of the turning arm taking place in substantially the reverse order.

*Operation*

Although the operation of the phonograph disclosed herein has been described in connection with the various views of the structure in the drawings, it will be briefly and generally summarized to emphasize certain features and details. In the normal non-playing position of the phonograph the record carriers J are in the stacked relation indicated in Figures 1 and 3 and the reproducing means H is releasably latched in a position out of the path of movement of a record which is being selected until that selected record is in position for reproduction. The records are always carried by and returned to the stack with a particular side or selection normally faced upwardly in the carrier.

A pair of rods or selector buttons 136 is provided for the selection of each record. These rods or selector buttons 136 are preferably laterally displaced and are disposed at a level such that the depression or actuation of either one of the rods of the pair stops the selector 122 in a position such that the single selected record is released for record changing movement by the operation of the selector. One of the rods of each pair effects the selection of the side of the record which is normally faced upwardly in the record carrier, while the other of the rods of the pair actuates one of the switches 64 or 65 in addition to stopping the selector at a predetermined level and thereby prepares the circuit and control mechanisms illustrated in Figure 2 for the turning of the record as has been described.

The reproducing means H is released from its normal position for the reproduction of each record after the record and its selected face have been placed in position for reproduction. After the reproduction of a particular record the reproducing means H is separated from the surface of the record and swung back to its normal position of rest before the record is returned to its normal position in the stack. Each record is returned to its normal position in the stack after reproduction.

One or more records or sides of records may be preselected for reproduction prior to the starting of the phonograph, or while it is in operation. The records and sides of records will be reproduced in sequence corresponding to the order of displacement of the selector rods 136 from top to bottom of the selector mechanism.

While we have shown and described an embodiment of our invention for the purpose of illustration, we do not wish to be restricted specifically thereto since various modifications may be made without departing from the spirit of the invention.

We claim:

1. In an automatic multi-record phonograph, a record turning mechanism comprising, in combination, support means including a rotatably supported shaft parallel to the axis of the record to be turned, a record turning arm secured to and swingable about the axis of said shaft, said record turning arm including a second shaft having its axis perpendicular to the axis of the first mentioned shaft and having record gripping means secured thereto near the end which is remote from the first mentioned shaft, a part of said record turning arm rotatably supporting said second shaft, a rack slidably mounted on the first mentioned shaft adjacent the record turning arm and normally rotatable with said first mentioned shaft, a cooperating pinion secured to the second shaft, means effecting rotation of the first mentioned shaft to swing the record turning arm and turn the rack therewith until said gripping means grips the edge of the record to be turned, means axially moving the first mentioned shaft and with it the record turning arm and rack after the gripping of the record, means engaging the rack during said axial movement of the first mentioned shaft for preventing rotation of the rack with the first mentioned shaft, means for rotating the first mentioned shaft to swing said record turning arm and thereby effect rotation of the second shaft due to cooperation of said rack and pinion, means effecting axial return movement of the first mentioned shaft and thereby effecting disengagement of said means engaging the rack for preventing rotation thereof, and means swinging the record turning arm away from the gripped record to release the gripped record from the gripping means.

2. In an automatic multi-record phonograph, record turning means comprising, in combination, record holding means, a record turning arm supported for swinging movement about an axis and having a rotatably supported element including a pinion and record gripping means, a rack supported for rotation about said axis and having teeth meshing with the pinion and disposed concentrically with respect to said axis, means swinging said arm and rack about said axis to effect gripping and release of a record by the gripping means while the record is held by the holding means, and means holding said rack against rotation about said axis after a record is gripped by the gripping means and before release of the record, said means swinging said arm continuing to swing said arm while said rack is held by the means holding said rack against rotation so that rotation of said element is effected by the meshing pinion and rack as said arm is swung about said axis.

3. In an automatic multi-record phonograph, record turning means comprising, in combination, a turntable adapted to carry a record for reproduction and having a central record locating stud, a record carried by said turntable and located thereon by said stud, means gripping the margin of said record, means including cooperating cam and lever means for linearly moving said gripping means and record to remove the record from said turntable and stud, means actuating said gripping means to effect simultaneous swinging of the gripping means and rotation of the record about the gripped margin thereof to turn the record over and effect reversed alignment thereof with said stud, said means including said cooperating cam and lever means linearly moving said gripping means and record to replace the record on the turntable and stud, and means effecting release of the record from the gripping means.

4. In an automatic multi-record phonograph, the combination of a linearly movable turntable, a plurality of record carriers individually movable into and from the path of said turntable to cooperate therewith in moving records to and from playing position, and means for effecting cooperative movement of said turntable and one of said record carriers at a time, with means for turning over the individual records as they are brought on the turntable to playing position to effect the reproduction of the side of any record previously facing the turntable, and record selecting means for selecting records for movement by said record carriers into and from the path of said turntable, including a plurality of pairs of manually operable record preselecting elements, said pairs of record preselecting elements corresponding in number to the number of record carriers, one of said preselecting elements in each said pair being adapted to predetermine for selection one side of the record in the corresponding record carrier, and the other of said preselecting elements in each said pair controlling the record turning means to predetermine for selection the opposite side of the record in the corresponding record carrier.

5. In an automatic multi-record phonograph, the combination of a reciprocable turntable, a pickup, a turntable drive motor, a plurality of individually movable record carriers each adapted to carry a double disc record, and means including a second motor for moving the record carriers one at a time to and from the path of the turntable and reciprocating the turntable in timed relation through a record carrier for receiving and moving records to and from playing position, with means operable in advance of playing for predetermining either side and both sides selectively of one or more records for play, record selecting means controlled by the predetermining means for selecting predetermined records for movement by the respective record carriers to and from the path of said turntable, and means including a third motor controlled by the predetermining means for reversing the selected record when brought to the playing position by said turntable, whereby the face of the selected record previously adjacent the turntable is uppermost and in playing position.

6. In an automatic multi-record phonograph, the combination of a reciprocable turntable for moving records one at a time to and from playing position, a turntable drive motor, a plurality of individually movable record carriers each arranged to carry a record in a particular position, and means including a second motor for moving the record carriers one at a time to and from the path of the turntable and reciprocating the turntable in timed relation for receiving and moving records one at a time to and from playing position, with means including a third motor for turning over records when moved to the playing position prior to and subsequent to playing of the record, record selecting means for selecting one or more records for movement to and from playing position, and means including a plurality of electrical switches for controlling the operation and sequence of operation of said motors.

7. In an automatic multi-record phonograph, the combination of a pickup, a plurality of individually movable record carriers, a reciprocable turntable adapted to cooperate with said carriers for moving records one at a time to and from playing position, a turntable drive motor, and means including a second motor for cooperatively moving the record carriers and the turntable, with means including a third motor for individually turning over records at playing position, switch means for starting the turntable motor and the second motor, switch means actuated by the second motor for controlling the operation of said second motor and starting the third motor, and switch means actuated by the third motor for controlling the operation of the third motor.

8. In an automatic multi-record phonograph, the combination of record reproducing means including a reciprocable turntable and record changing means including individually movable record carriers, with record selecting means including means for selecting for play either side and both sides of a selected record, means for turning a selected record over at its playing position, a plurality of separate prime movers operatively coupled with said turntable, record changing means, and the record turning means for reciprocating said turntable and for operating said record changing means and the record turning means, and means for controlling the operation and sequence of operation of said prime movers.

9. In an automatic multi-record phonograph, the combination of movable record carriers each carrying a record for reproduction, a reciprocable turntable adapted to cooperate with said record carriers by passing therethrough for receiving and moving one record at a time to and from playing position, and record selector means, with record predetermining means including a pair of manually movable elements for each of the record carriers, the movable elements of each of said pairs cooperating with the record selector means for effecting selection of a predetermined one of the record carriers, means at the playing position of the records for turning over a selected record to arrange the face thereof previously adjacent the turntable in playing position, and switch means controlled by one of the movable elements of each of said pairs for effecting operation of the means for turning over a selected record when said selected record is brought to playing position by said turntable.

10. In an automatic multi-record phonograph, the combination of a turntable adapted to support a record for playing, with a shaft parallel to the axis of the turntable, record gripping means for gripping the margin of a record on said turntable and swingable through an acute angle about said shaft and over said turntable, a second shaft rotatably supported for rotation about an axis perpendicular to the axis of the first mentioned shaft, said record gripping means being secured to and rotatable with the second shaft, a rack having teeth in a plane transversely of the first mentioned shaft, a cooperating pinion secured to the second shaft and means for swinging said record gripping means about the axis of the first mentioned shaft to gripping position for a record on the turntable, and over said turntable to the opposite side thereof, the gear ratio of the rack and pinion being such that the second shaft is rotated 180° during the acute angle movement of the record gripping means about the first said shaft.

11. In an automatic multi-record phonograph having movable record carriers carrying a plurality of records for reproduction and a cooperatively movable turntable for moving records to and from playing position, record selecting means for selecting one or more of the records for reproduction, record carrier moving means for moving each selected record and its carrier into cooperative position with respect to said turntable, means for moving said turntable with respect to the record carrier in cooperative position whereby each selected record is removed from the record carrier by the turntable and thereby moved to playing position, the improvement which comprises means for gripping one margin of any record on the turntable and raising the gripped record to a position above the turntable, means for swinging the gripping means to move the gripped edge of the raised record across the turntable and at the same time rotate the gripping means to turn over the record as it is moved across the turntable, and means operating the gripping means for lowering the record to a position on said turntable and releasing the record.

12. In an automatic phonograph having a turntable for supporting a record during the reproduction thereof, record gripping means for gripping the margin of a record on said turntable, means for moving the record gripping means to remove the gripped record linearly from the turntable, means for moving the record gripping means to swing the gripped margin of the removed record in an arcuate path above and to traverse said turntable and simultaneously to rotate the record substantially 180° about an axis at the swinging gripped margin thereof, means for linearly moving the gripping means to return the gripped record to its position on the turntable, and means operating said record gripping means for releasing the gripped margin of the record after it is returned to the turntable.

13. In an automatic phonograph adapted to play either or both sides of a record, a record gripper for gripping the margin of a record to be turned, means for linearly raising the record gripper within the gripped record, means for horizontally moving the record gripper to swing the gripped margin of the record in an arcuate path and simultaneously rotate the record substantially 180° about an axis parallel to a tangent of the moving gripped margin of the record, means for lowering the record gripper with the gripped record, and means operating the record gripper for releasing the gripped margin of the lowered record.

14. In an automatic multi-record phonograph wherein a turntable and individually movable record carriers are cooperable in timed relation to move one record at a time to and from playing position, the combination of record predetermining means operable in advance of playing for predetermining either or both sides of any one or more records to be moved to playing position, means governed in part by said record predetermining means for selecting every record predetermined for movement to playing position, and record turning means controlled in part by said predetermining means for reversing each record after delivery thereof to playing position where the reverse side of such record has been predetermined by said record predetermining means, and before removing any such reversed record from playing position for again reversing said record.

15. In an automatic multi-record phonograph wherein a turntable and individually movable record carriers are cooperable in timed relation to move one record at a time to and from playing position, the combination of record predetermining means operable in advance of playing for predetermining either or both sides of any one or more records to be moved to playing position, means governed in part by said record predetermining means for selecting every record predetermined for movement to playing position, and record turning means controlled in part by said predetermining means for reversing each record after delivery thereof to playing position where the reverse side of such record has been predetermined by said record predetermining means.

16. In an automatic multi-record phonograph wherein a movable turntable in moving to and from playing position cooperates with individually movable record carriers to remove records from their respective record carriers and move the records one at a time to playing position and after playing to return each record to the record carrier, the combination of record predetermining means operable in advance of playing for predetermining either or both sides of any one or more records to be picked up by said turntable, means governed in part by said record predetermining means for selecting each record having a side predetermined by said record predetermining means, and record turning means adjacent said turntable and controlled in part by said record predetermining means for reversing each record after it is picked up by said turntable, the reverse side of which has been predetermined by said record predetermining means.

JAMES A. DAVIS.
IRVING GIL.

CERTIFICATE OF CORRECTION.

Patent No. 2,339,062.                                    January 11, 1944.

JAMES A. DAVIS, ET AL.

It is hereby certified that error appears in the printed specification of the above numbered patent requiring correction as follows: Page 2, second column, line 20, for "egect" read --effect--; page 10, first column, line 38, claim 13, for the word "within" read --with--; and that the said Letters Patent should be read with this correction therein that the same may conform to the record of the case in the Patent Office.

Signed and sealed this 8th day of August, A. D. 1944.

Leslie Frazer

(Seal)                                        Acting Commissioner of Patents.